United States Patent
Kern (10) Patent No.: US 9,909,551 B2
(45) Date of Patent: Mar. 6, 2018

(54) METHOD OF ENGINE CONTROL FOR ELIMINATING KNOCKING COMBUSTION DUE TO A MISFIRE FOR SPARK-IGNITED ENGINES EQUIPPED WITH EXTERNAL EXHAUST GAS RECIRCULATION

(71) Applicant: Robert Bosch GmbH, Stuttgart (DE)

(72) Inventor: Justin Michael Kern, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 433 days.

(21) Appl. No.: 14/796,648

(22) Filed: Jul. 10, 2015

(65) Prior Publication Data

US 2017/0009728 A1    Jan. 12, 2017

(51) Int. Cl.
*F02P 5/152*    (2006.01)
*F02P 5/15*    (2006.01)

(52) U.S. Cl.
CPC ............. *F02P 5/152* (2013.01); *F02P 5/1516* (2013.01); *Y02T 10/46* (2013.01)

(58) Field of Classification Search
CPC .......... F02P 5/152; F02P 5/1516; Y02T 10/46
See application file for complete search history.

(56) References Cited

U.S. PATENT DOCUMENTS

| | | | |
|---|---|---|---|
| 6,827,061 B2 | 12/2004 | Nytomt et al. | |
| 7,509,932 B2 | 3/2009 | Hara et al. | |
| 7,946,263 B2 | 5/2011 | O'Neill et al. | |
| 8,176,893 B2 | 5/2012 | Glugla et al. | |
| 8,223,005 B2 | 7/2012 | Koenig | |
| 2004/0187847 A1* | 9/2004 | Viele | F02D 35/021 123/406.27 |
| 2005/0039721 A1 | 2/2005 | Truscott et al. | |
| 2007/0107692 A1 | 5/2007 | Kuo et al. | |
| 2011/0303188 A1* | 12/2011 | Asami | F02D 35/027 123/406.48 |
| 2015/0019112 A1* | 1/2015 | Shiraishi | F02D 35/021 701/111 |
| 2015/0176513 A1* | 6/2015 | Lana | F02D 41/1439 123/406.48 |

* cited by examiner

*Primary Examiner* — Hieu T Vo
*Assistant Examiner* — Arnold Castro
(74) *Attorney, Agent, or Firm* — Michael Best & Friedrich LLP (57) ABSTRACT

An engine control system and method of reducing knocking combustion in a spark-ignited internal combustion engine having exhaust gas recirculation by controlling engine timing based on detection of a misfire in an engine cylinder. The engine control system determines a number of combustion cycles indicative of an amount of time that will pass before misfire gas from the detected misfire will be recirculated to a combustion chamber of any cylinder of the internal combustion engine, and the engine control unit reduces or prevents knocking combustion by adjusting the ignition timing of at least one subsequent combustion cycle after the determined number of combustion cycles have occurred since the misfire was detected.

18 Claims, 5 Drawing Sheets

METHOD OF ENGINE CONTROL FOR ELIMINATING KNOCKING COMBUSTION DUE TO A MISFIRE FOR SPARK-IGNITED ENGINES EQUIPPED WITH EXTERNAL EXHAUST GAS RECIRCULATION

BACKGROUND

Embodiments of the invention relate to spark-ignited internal combustion engines that include external exhaust gas recirculation and methods of operating an engine control unit for such an engine.

SUMMARY

An exhaust gas recirculation system recirculates exhaust gas from combustion back into the intake side of the engine. The exhaust gas recirculation system controls what portion of exhaust gas is reintroduced into the input stream of the engine. Exhaust gas contains a previously combusted fuel and air mixture and thus contains very low levels of combustible materials. When exhaust gas is reintroduced into the input side of the engine, it mixes with a fuel and air mixture for combustion and reduces the available amount of combustible material for each input stroke of the engine. When the mixture enters into a combustion chamber in a cylinder of the engine, the exhaust gas portion does not burn and thus reduces overall combustion temperature. In other words, by injecting exhaust gas into the input side of the engine, peak cylinder temperature is reduced. Environmentally-harmful nitrogen oxides ($NO_x$) can be produced at high engine temperatures. Therefore, reducing peak cylinder temperature helps reduce harmful nitrogen oxide emissions.

The amount of exhaust gas that is recirculated is regulated by an exhaust gas recirculation valve. The mixture of fuel and air (i.e., fuel/air charge) for combustion is mixed with exhaust gas prior to intake by the engine. The ratio of exhaust gas to the fuel/air charge is important to maintain combustion within proper ranges. In some cases, when the ratio of exhaust gas to fuel/air charge is suboptimal, the engine misfires. Other mechanisms may also cause an engine to misfire, such as, for example, a broken spark plug. In particular, an excessive amount of noncombustible exhaust gas present in the intake may prevent or hinder combustion. In such a case, the fuel/air charge does not ignite in the cylinder. This results in a mixture of unburned fuel and air (i.e., unburned fuel/air charge) in the exhaust stream. A portion of the unburned fuel/air charge would then recirculate through the exhaust gas recirculation valve into the intake manifold and mix with a new fuel/air charge. This may create an overcharge of combustible material. The engine intakes this mixed fuel/air charge into one or more cylinders depending on a position of the crankshaft of the engine. When ignited in a cylinder, the overcharge may result in engine knock, which, among other things, causes undue stress on the engine.

Some embodiments of the invention provide a method and a system of engine control to mitigate knocking combustion due to an overcharge of fuel/air caused by a misfire. An engine control unit monitors and controls the sequence of operation of the engine including the exhaust gas recirculation valve and ignition timing. The engine control unit, through engine sensors, is configured to sense and determine if a misfire occurred in a cylinder of the engine. When a misfire occurs, the engine control unit adjusts the ignition timing according to methods such as those presented herein. The adjustment to the ignition timing reduces or eliminates knocking combustion due to the unburned fuel/air charge that is recirculated through the exhaust gas recirculation value.

In one embodiment, the invention provides a method of reducing knocking combustion in a spark-ignited internal combustion engine having exhaust gas recirculation by controlling engine timing. Once a misfire is detected in an engine cylinder, a number of combustion cycles is determined indicative of an amount of time that will pass before misfire gas from the detected misfire will be recirculated to a combustion chamber of any cylinder of the internal combustion engine. Knocking combustion is reduced or prevented by adjusting the ignition timing of at least one subsequent combustion cycle occurring after the determined number of combustion cycles have occurred since the misfire was detected.

In another embodiment the invention provides an engine system for reducing knocking combustion in a spark-ignited internal combustion engine having exhaust gas recirculation. The engine system includes a spark-ignited internal combustion engine, an exhaust gas recirculation system, a misfire detection sensor, and an engine control unit. The engine control unit is configured to detect a misfire in an engine cylinder and determine a number of combustion cycles indicative of an amount of time that will pass before misfire gas from the detected misfire will be recirculated to a combustion chamber of any cylinder of the internal combustion engine. The engine control unit is further configured to reduce or prevent knocking combustion by adjusting the ignition timing of at least one subsequent combustion cycle occurring after the determined number of combustion cycles have occurred since the misfire was detected.

In yet another embodiment, the invention provides an engine control unit for reducing knocking combustion in a spark-ignited internal combustion engine having exhaust gas recirculation. The engine control unit includes an input port configured to receive a misfire signal indicative of a misfire in a cylinder of the spark-ignited internal combustion engine, a processor, and a non-transitory, machine-readable medium. The engine control unit is configured to detect a misfire signal and determine a number of combustion cycles indicative of an amount of time that will pass before misfire gas from the detected misfire will be recirculated to a combustion chamber of any cylinder of the internal combustion engine. The engine control unit is further configured to reduce or prevent knocking combustion by adjusting the ignition timing of at least one subsequent combustion cycle occurring after the determined number of combustion cycles have occurred since the misfire was detected.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory, computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
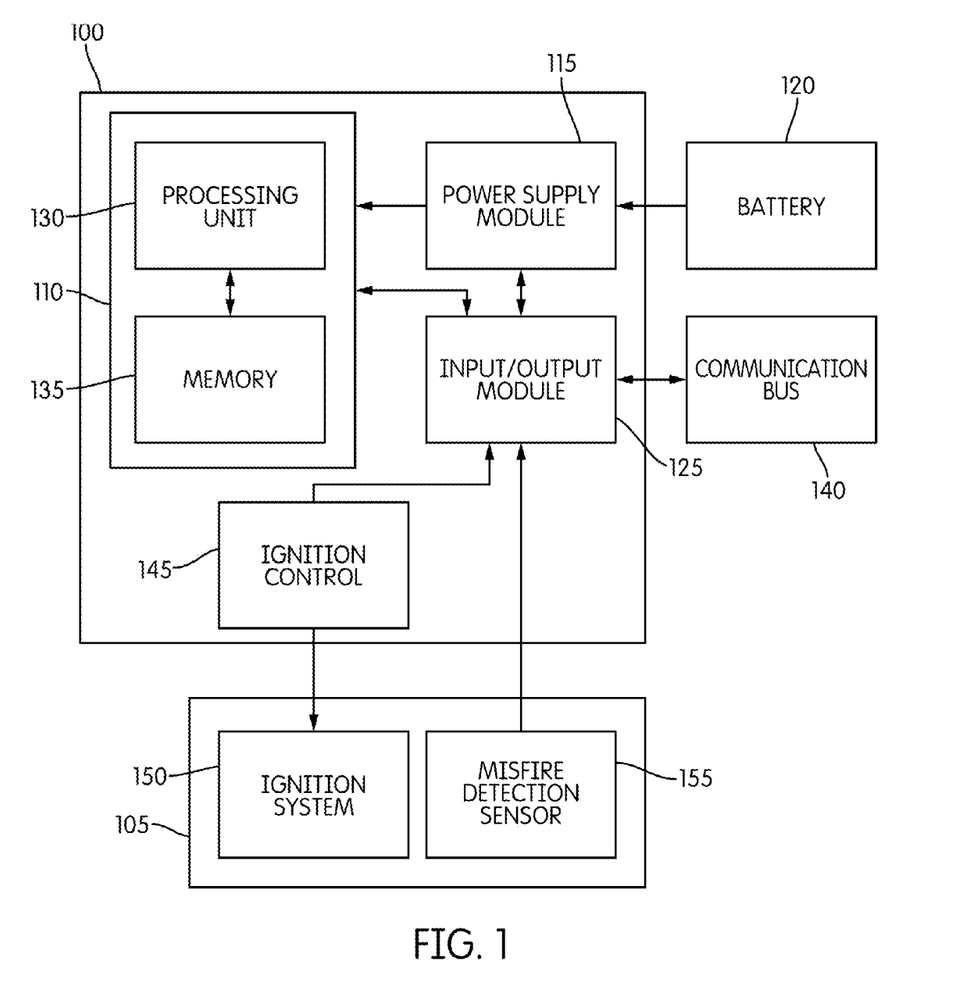
FIG. 1 is a block diagram of an engine control unit according to embodiments of the invention.

FIG. 1 is a block diagram of an embodiment of the engine control unit (ECU 100). The ECU 100 includes a plurality of electrical and electronic components that provide power, operation control, and protection to the components and modules within the ECU 100 and/or the engine 105. For example, the ECU 100 includes, among other things, a controller 110 (such as a programmable microprocessor, microcontroller, or similar device), a power supply module 115 that receives power from a vehicle battery 120, and an input/output module 125. The controller 110 includes, among other things, a processing unit 130 and a memory 135. The processing unit 130 is electrically connected to the memory 135 and is configured to retrieve and store data from memory 135. The processing unit 130 also receives and executes instructions stored on the memory 135 to provide the functionality described below.

In other implementations, the ECU 100 may include additional, fewer, or different components. For example, the ECU 100 may include multiple controllers and/or software routines dedicated to each function of the ECU 100. The ECU 100 may determine ignition timing and engine control using software routines embedded in a plurality of controllers of the ECU 100. In addition, the ECU 100 may be configured to transmit engine data over a communication bus 140 to external controllers configured to operate and control various vehicle systems.

The ECU 100 may also be configured to receive information about the engine 105 from various sensors connected to the engine 105 and/or engine systems that are not expressly illustrated in FIG. 1. For example, the ECU 100 may receive vehicle information from, among other things, a throttle position sensor, a temperature sensor, an oxygen sensor, a crankshaft position sensor, a camshaft position sensor, and an ignition sensor. Based on the vehicle information, the ECU 100 controls various mechanical and electrical components of the engine 105 such as a throttle, an ignition coil, fuel injectors, and an exhaust gas after-treatment system. The ECU 100 may also be configured to adjust the ignition control 145 to adjust the timing of ignition of the ignition system 150 without affecting the other engine systems.

The input/output module 125 transmits information from the ECU 100 and receives information for the ECU 100. The input/output module 125 receives information directly from sensors for the engine 105. In the example of FIG. 1, the input/output module 125 receives information from a misfire detection sensor 155. The misfire detection sensor 155 may be of various styles or constructions and may use various different methods to detect the misfire. In particular, the misfire detection sensor 155 may be configured to sense engine crankshaft speed and/or crankshaft acceleration. In such a case, the ECU 100 determines if a misfire occurred based on the misfire detection sensor 155 sensing an abnormal speed and/or acceleration of the crankshaft. Alternatively, the misfire detection sensor 155 may be configured to directly or indirectly detect ignition and/or combustion effects produced by the engine 105. In those cases, the misfire detection sensor 155 may detect abnormal currents and/or voltages through the sparkplug. In another alternative, the misfire detection sensor 155 may include an in-cylinder pressure sensor, which directly measures combustion pressure. In this case, the ECU 100 determines if a misfire occurred based on abnormal cylinder pressures during that stage of the crankshaft position. Regardless of the technique by which the misfire detection sensor 155 senses a misfire, the ECU 100 is configured to classify certain predetermined events as a misfire.

Figure 2:
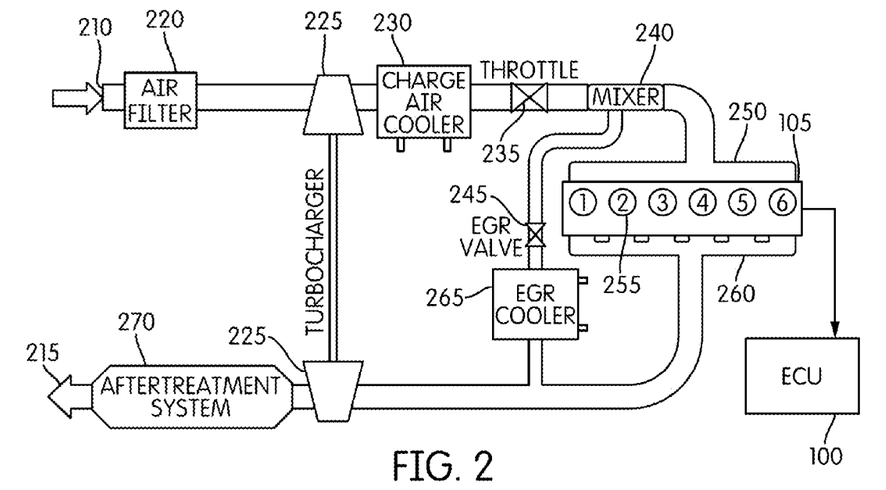
FIG. 2 is a block diagram of a spark-ignited engine including an exhaust gas recirculation system and the engine control unit of FIG. 1.

FIG. 2 illustrates a six-cylinder, internal combustion engine with an intake system 210 and an exhaust system 215. An inlet air filter 220 collects and filters outside air that is used for combustion in the engine 105. In some embodiments, the inlet air filter 220 is connected to a turbocharger 225. The turbocharger 225 is connected to a charge air cooler 230, and the charge air cooler 230 is connected to a throttle 235. The throttle 235 is connected to one of two inputs to a mixer 240. Another input of the mixer 240 is connected to an exhaust gas recirculation valve 245. An output of the mixer 240 is connected to an intake manifold 250 of the engine 105. In this example, each of the six cylinders 255 receives inlet air from the intake system 210 of the engine 105. The cylinders 255 are connected to the exhaust system 215 via an exhaust manifold 260. The exhaust system 215 includes an exhaust gas recirculation cooler 265 and the exhaust gas recirculation valve 245. In particular, the exhaust gas recirculation cooler 265 is directly connected to the exhaust gas recirculation valve 245. The exhaust system 215 also includes an exhaust-side portion of the turbocharger 225 and an exhaust gas after-treatment system 270.

Intake air for combustion enters through the air filter 220 and is pressurized by the turbocharger 225. Pressurized air is then cooled by the charge air cooler 230 and directed to the throttle 235. The throttle 235 then regulates the amount of air sent to the engine 105 for combustion based on the load and desired power output of the engine 105. The mixer 240 combines the air for combustion with an amount of recirculated exhaust gas that is regulated by the exhaust gas recirculation valve 245. Fuel (not shown) is mixed with the air for combustion and the recirculated exhaust gas either prior to entry into the intake manifold 250 of the engine 105 or after entry into the intake manifold 250 of the engine 105. Once mixed, the fuel, the air for combustion, and the recirculated exhaust gas become a fuel/air charge, which is ready for combustion. The air/fuel charge enters into the cylinders depending on the crankshaft position and the inlet valves, which determine the input stroke of the engine 105. The ECU 100 controls timing of spark-ignition of the fuel/air charge depending on various vehicle parameters. For example, the ECU 100 may consider the load on the vehicle, the rotational speed of the crankshaft, and a position of the throttle 235 when determining spark timing. After combustion, the fuel/air charge becomes exhaust gas, which is released into the exhaust system 215. A portion of the exhaust gas circulates back through the exhaust gas recirculation valve 245 to the mixer 240 to be reintroduced into the engine 105. The remaining exhaust gas powers the turbocharger 225, is treated by the exhaust gas after-treatment system 270, and is expelled from the vehicle.

Figure 3:
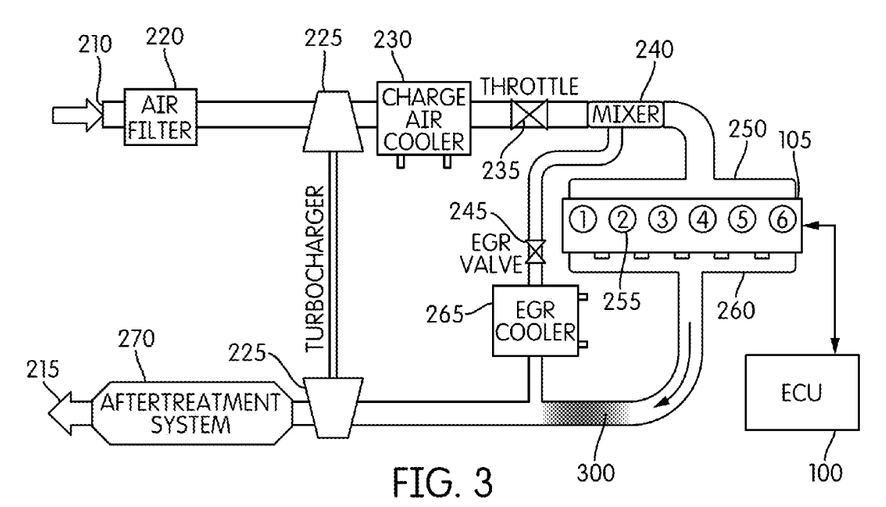
FIG. 3 is the block diagram of FIG. 2 when an unburned fuel/air mixture is present in the exhaust system.
Figure 4:
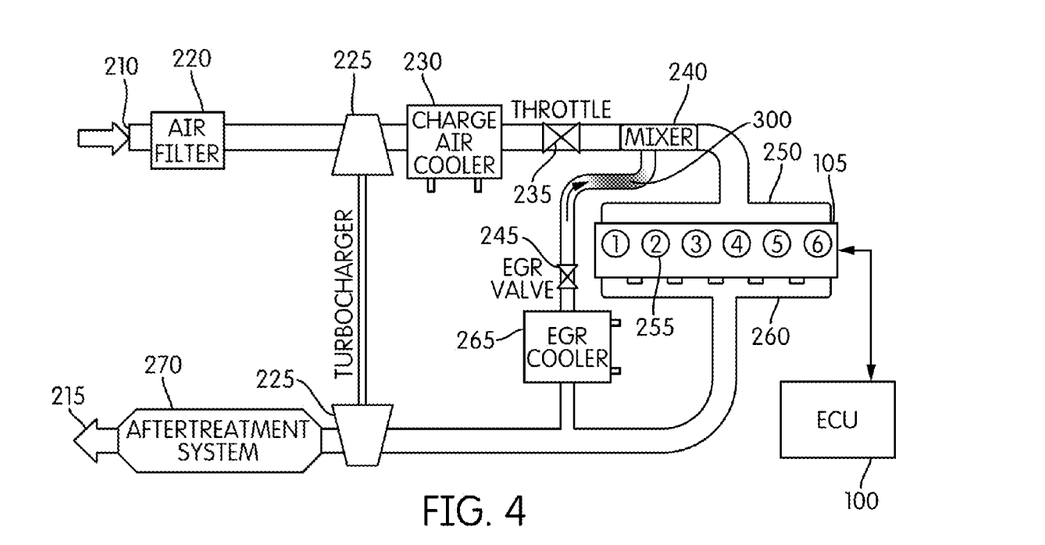
FIG. 4 is the block diagram of FIG. 2 when the unburned fuel/air mixture passes through the exhaust gas recirculation system.
Figure 5:
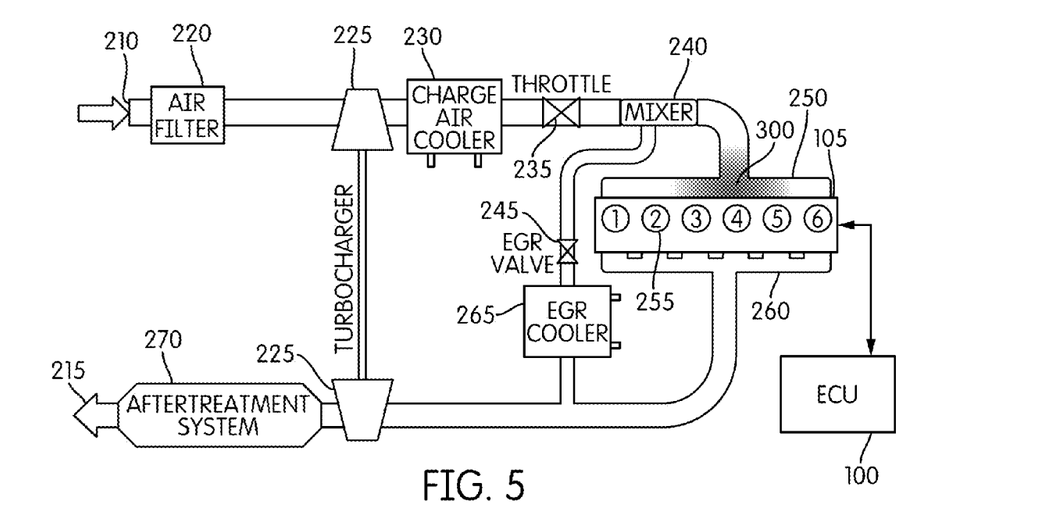
FIG. 5 is the block diagram of FIG. 2 when the unburned fuel/air mixture enters an intake manifold of the engine.

FIGS. 3-5 illustrate a sequence of conditions for an occurrence of abnormal combustion (i.e., a misfire) in one cylinder of the system illustrated in FIG. 2. Due to incomplete combustion caused by the misfire, a slug of unburned fuel/air (i.e., slug of un-burnt fuel/air mixture 300) is exhausted from the engine 105. The slug of un-burnt fuel/air mixture 300 is carried along with the normal exhaust gasses through the exhaust system 215. As illustrated in FIG. 4, a portion of the slug of un-burnt fuel/air mixture 300 is recirculated via the exhaust gas recirculation valve 245 into the mixer 240. At the mixer 240, the portion of slug of un-burnt fuel/air mixture 300 mixes with fresh combustion air before reentry into the intake manifold 250. The slug of un-burnt fuel/air mixture 300 enters into one or more cylinders 255 depending on the crankshaft position and is ignited along with a new air/fuel charge as illustrated in FIG. 5. Due to the presence of the slug of un-burnt fuel/air mixture 300 mixed with the new air/fuel charge, each of the cylinders 255 that contain the slug of un-burnt fuel/air mixture 300 are overloaded with combustible material. This causes the engine 105 to be much more susceptible to ignition of the new air/fuel mixture outside of designed conditions. Such an ignition may vary in intensity, location, and timing. The ignition caused from overload of the cylinders 255 may create a shockwave that results in a steep pressure rise exceeding design specifications. This abnormal ignition may cause pinging or banging sounds from the engine 105. These sounds indicate that the engine 105 is experiencing knocking combustion or simply engine knock.

Figure 6:
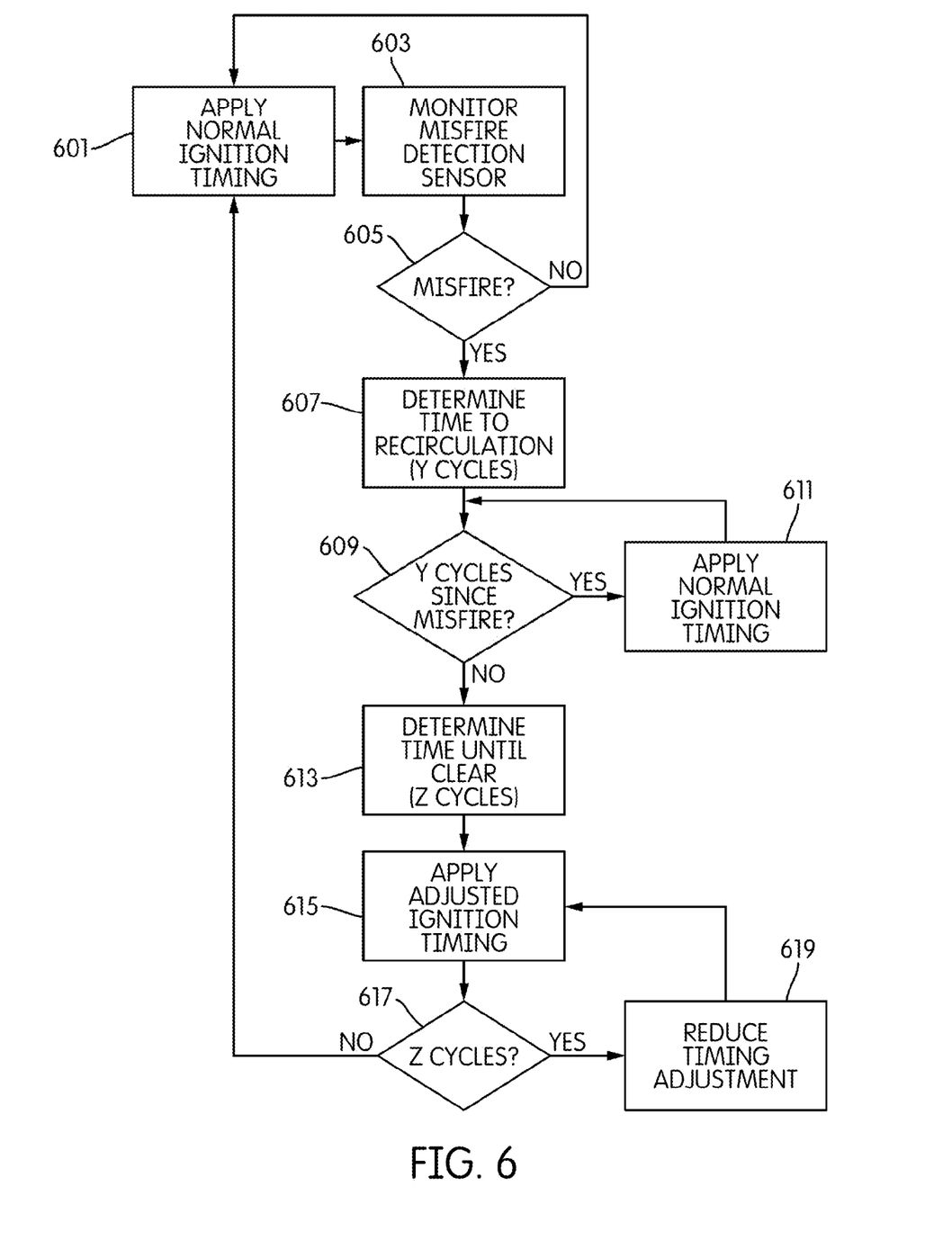
FIG. 6 is a flow chart of a method for operating the engine control unit of FIG. 1 to prevent/reduce engine knock in response to a detected misfire.

FIG. 6 illustrates a method of controlling the ECU 100 to reduce or eliminate knocking combustion in the system of FIG. 2. The ECU 100 is configured to control combustion using normal ignition timing (step 601) and monitors the misfire detection sensor 155 for instances of misfires (step 603). The ECU 100 determines whether a misfire has occurred based on the misfire detection sensor 155 (step 605). If a misfire has not been detected, the ECU 100 continues to control the engine according to normal ignition timing (step 601).

When a misfire is detected, the ECU 100 determines a length of time (Y) (e.g., a number of cylinder combustions or a change in crankshaft angle) until the slug of unburned fuel/air mixture 300 will recirculate through the exhaust gas recirculation valve 245 and enter into one or more cylinders 255 of the engine 105 (step 607). This amount of time can be determined by calculating a value at the time that the misfire is detected based on vehicle operating conditions or by accessing a preprogrammed value stored to the memory that was previously calibrated for the particular configuration of the vehicle/engine. Until the determined time of recirculation has elapsed (step 609), the ECU 100 continues to control the engine based on the normal ignition timing (step 611).

The ECU 100 also determines a time (Z) until the slug of unburned fuel/air mixture from the misfire will clear the engine and the risk of harmful engine knock is removed (step 613). Again this time period may be determined by calculating a value based on current operating conditions or by accessing a preprogrammed value stored to the memory that was previously calibrated for the particular configuration of the vehicle/engine. After the recirculation time has elapsed (e.g., a determined number of cylinder combustions have occurred) (step 609), the ECU 100 adjusts the ignition timing of each cylinder that is expected to receive a portion of the slug of unburned fuel/air mixture from the misfire (i.e., each cylinder combustion until the determined number of cycles Z have occurred).

More specifically, as illustrated in the example of FIG. 6, the ECU 100 applies the adjusted ignition timing for the current cylinder combustion cycle (step 615) and determines whether the determined number of cycles Z have occurred with adjusted ignition timing (step 617). If not, the system reduces the timing adjustment (step 619) and applies the reduced timing adjustment during the next cylinder combustion (step 615). As discussed in further detail below, the duration of the timing adjustment is reduced in each successive affected cylinder combustion because each subsequent cylinder will presumably receive a lesser portion of the unburned fuel/air mixture from the misfire.

When the ignition timing has been adjusted for the predetermined number of combustions (step 617) and the risk of knocking combustion due to the slug of un-burnt fuel/air mixture 300 has passed or is lessened, the ECU 100 resumes control of the engine according to the normal ignition timing (step 601).

As noted above, the ECU 100 may determine the length of time of recirculation (Y) of the fuel/air mixture from the misfire and the length of time until the fuel/air mixture from the misfire clears the engine based on the operating conditions of the engine 105 or based on predetermined parameters loaded into memory 135 of the ECU 100. The predetermined parameters may be predetermined based on engine design and/or calibration and testing. For example, during manufacturing of a vehicle, the engine 105 may be experimentally tested to determine the precise time values or crankshaft angles indicating various positions of the slug of un-burnt fuel/air mixture 300. The ECU 100 may reference a lookup table stored in the memory 135 containing the predetermined parameters. For example, the ECU 100 may load operating conditions at the time of the misfire and determine, based on the operating conditions, a proper timing response based also on the predetermined parameters.

The slug of un-burnt fuel/air mixture 300 may recirculate through the exhaust gas recirculation valve 245 and reenter into the intake manifold over a plurality of combustion cycles of the cylinders 255. However, during recirculation, only a portion of the slug of un-burnt fuel/air mixture 300 is recirculated. As such, in the example of FIG. 6 (and in FIG. 7 as discussed below), the concentration of the slug of un-burnt fuel/air mixture 300 to the new fuel/air charge decreases over time. The ECU 100 is configured to adjust the ignition timing over multiple consecutive combustion cycles until the concentration of slug of un-burnt fuel/air mixture 300 to the new fuel/air charge is negligible. In other words, the ECU 100 is configured to adjust the ignition timing over a period of time that some of the cylinders 255 are likely to experience increased fuel and air charge due to the slug of un-burnt fuel/air mixture 300 being recirculated. However, in other implementations, the ECU 100 may be programmed to apply the same, static ignition timing delay for the entire period Z (i.e., for all cylinder combustions between the time that the slug of un-burnt fuel/air mixture 300 reenters one of the cylinders and the time that the slug of un-burnt fuel/air mixture 300 clears the engine).

Figure 7:
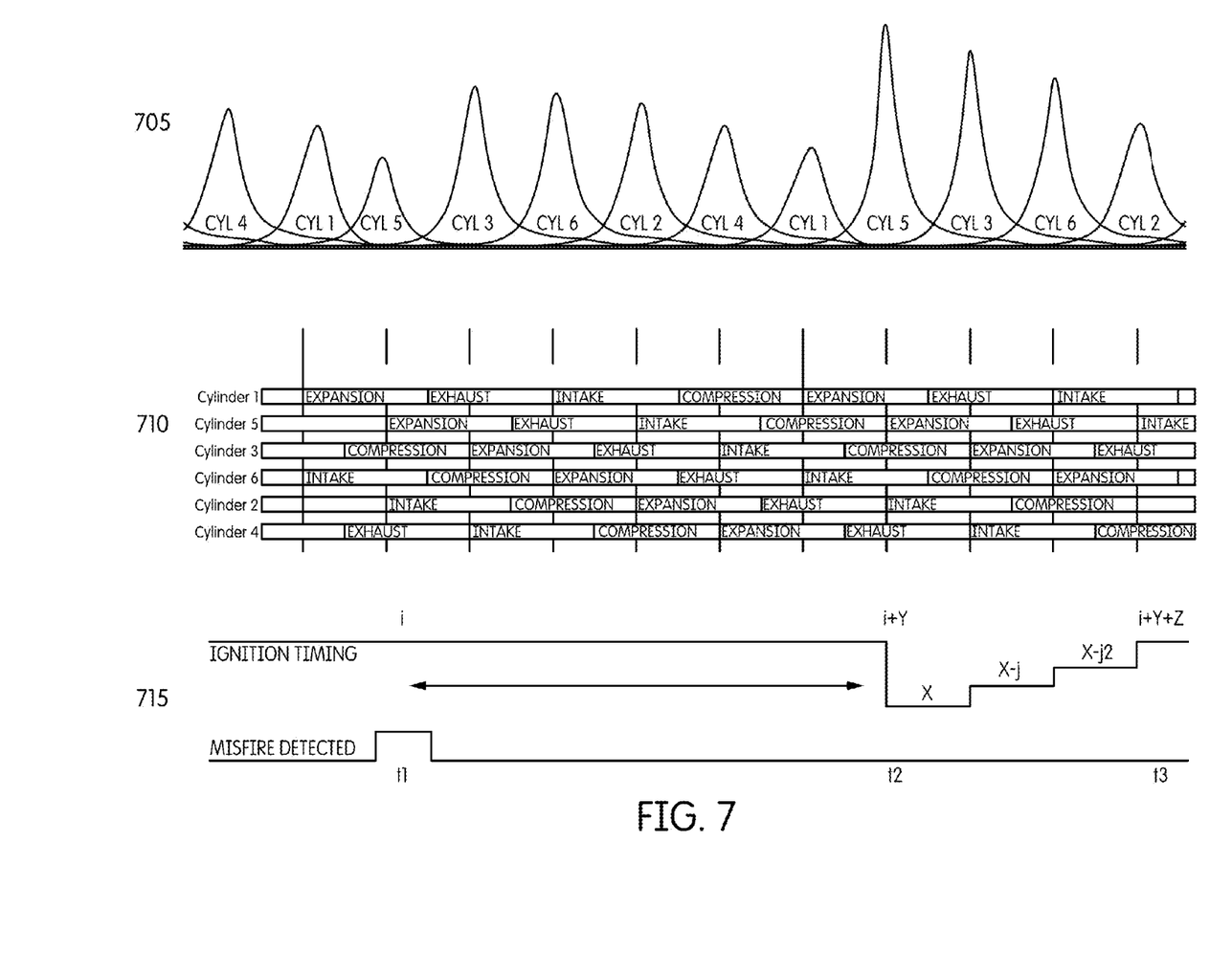
FIG. 7 is a series of graphs and timing diagrams illustrating engine conditions and control parameters for a series of combustion cycles including a misfire and a control reaction to the misfire.

FIG. 7 illustrates the effect of a misfire on consecutive ignition cycles and also illustrates a timing response by the ECU 100 to the misfire. In the upper graph 705, cylinder pressure at each of the cylinders 255 is plotted versus crankshaft angle position over two complete revolutions of the crankshaft. In the middle graph 710, a current state of each one of the cylinders 255 is plotted versus crankshaft angle over the same duration. The state of each one of the cylinders 255 corresponds to a combustion cycle of the engine 150 having a 4-stroke combustion cycle (i.e., intake, compression, expansion, and exhaust). In the lower graph 715, the ignition timing and a detection of a misfire are plotted versus crankshaft angle position over the same duration.

At time t1, a misfire occurs in cylinder 5. The ECU 100 detects the misfire via the misfire detection sensor 155. At this time, as illustrated in the upper graph 705, the pressure in cylinder 5 is lower than would be for normal combustion due to incomplete combustion caused by the misfire. Over the next few ignition cycles for the other cylinders 3, 6, 2, 4, and 1, cylinder pressure in the respective cylinders 3, 6, 2, 4, and 1 is not affected because the slug of un-burnt fuel/air mixture 300 has not yet recirculated to the intake manifold. During the intake stroke of cylinder 5, a portion of the slug of un-burnt fuel/air mixture 300 and the new fuel/air charge enters into cylinder 5. At time t2, the slug of un-burnt fuel/air mixture 300 along with the new fuel/air charge is ignited in the first affected cylinder (e.g., cylinder 5). Due to the slug of un-burnt fuel/air mixture 300, the pressure in cylinder 5 may exceed a normal peak operating pressure. During each successive intake stroke, for example, by cylinder 3, then cylinder 6, a portion of the slug of un-burnt fuel/air mixture 300 and the new fuel/air charge enters into that respective cylinder. The portion of the slug of un-burnt fuel/air mixture 300 that enters cylinder 3 may be smaller than the portion of the slug of un-burnt fuel/air mixture 300 that entered cylinder 1. However, the portion of slug of un-burnt fuel/air mixture 300 that enters cylinder 3 may also cause an excessive peak operating pressure.

The lower graph 715 of the ignition timing illustrates a control reaction by the ECU 100 to the misfire at t1. When the ECU 100 detects the misfire condition at time t1 (see, step 605 in FIG. 6), the ECU 100 waits for the determined length of time Y between t1 and t2 corresponding to the length of time that it takes for the slug of un-burnt fuel/air mixture 300 to be recirculated (see step 609 in FIG. 6). The ECU 100 may also determine a length of time Z between t2 and t3 corresponding to the length of time that the slug of un-burnt fuel/air mixture 300 may affect combustion (i.e., time until the slug of un-burnt fuel/air mixture 300 in the cylinders 255 is negligible) (see step 617 in FIG. 6).

After the time interval Y, the ECU 100 adjusts the ignition timing to delay ignition of the affected cylinder. In this example, the ignition timing of cylinder 5 is delayed by a set time interval (or change in crankshaft angle) denoted X. At the next ignition event (i.e., for cylinder 3), the ECU 100 again delays the ignition timing; however, the delay is less than delay X and is denoted in FIG. 7 as X−j, where X is the initial timing delay and j is an adjustment factor that is used to gradually reduce the delay period in each subsequent affected combustion. In the next ignition event (i.e., for cylinder 6), the ECU 100 delays the ignition timing by a third set time interval denoted X−2j. Lastly, after the third combustion event with an adjusted ignition timing, the ECU 100 determines that time period Z has passed and the unburned gas from the misfire has passed through the engine. As such, in the next ignition event (i.e., for cylinder 2), the ECU 100 applies the normal ignition timing. The ignition timing delay intervals X, X−j, and X−2j applied during the combustion in each respective cylinder that would be affected by the recirculation of the misfire gas reduces the peak operating pressure in each respective cylinder. This effectively eliminates knocking that may have otherwise occurred in the engine due to the recirculation of the slug of un-burnt fuel/air mixture 300.

Each of the successive delay intervals X, X−j, and X−2j decrease the adjustment made by the ECU 100 of the ignition timing. In other words, for each successive combustion cycle the ignition timing is incrementally adjusted to be closer to the original ignition timing. The time intervals in the example of FIG. 7 are exemplary, and more or fewer delay intervals may be utilized depending on the characteristics of the engine 105. In addition, the appropriate magnitude of the delay intervals X, X−j, and X−2j may depend on the particular engine system and may be adjusted accordingly.

The ECU 100 may adjust ignition timing for several successive ignitions or several successive engine cycles. The timing may be based on actual time as measured by the ECU 100 or by a crankshaft angle position and speed also as measured by the ECU 100. In the examples discussed above, the ignition timing is adjusted by a set amount of degrees of the crankshaft angle. In some embodiments, the ignition timing is adjusted for all cylinders 255 by a predetermined amount of crankshaft angle over a predetermined amount of combustions, starting at a misfire event. Alternatively, the ECU 100 may adjust the ignition timing of only the cylinders affected by the intake of slug of un-burnt fuel/air mixture 300. The ignition timing may be adjusted independently for each of the cylinders 255 based on the predetermined time intervals t1-t2 and t1-t3 in order to balance the risk of knock with increased engine performance. Once the set period of time t1-t3 is over, the ECU 100 may apply the original ignition timing to the engine 105.

In some implementations, the timing adjustments (X, X−j, X−2j), whether based on time or crankshaft angle, are also adjustable based on engine performance and combustion requirements. For example, the ECU 100 may be configured to adjust ignition timing, or other combustion-related processes, based on torque, load, speed, and emission requirements. The ECU 100 incorporates the timing adjustments (X, X−j, X−2j) due to misfires into a control routine based on these other combustion-related processes.

It should be noted that the methods disclosed herein may apply to various constructions of spark-ignited engines. In other words, the method is not necessarily restricted to specific examples presented herein. For example, the methods and systems described above could also be applied to engines with 4 cylinders, 6 cylinders, as well as others and for engines not based on a 4-stroke combustion cycle.

Thus, the invention provides, among other things, a system and method for controlling the ignition cycle of a vehicle with a spark-ignited engine and exhaust gas recirculation by detecting a misfire and adjusting ignition timing based on the timing of exhaust gas recirculation. Various features and advantages of the invention are set forth in the following claims.

What is claimed is:

1. A method of reducing knocking combustion in a spark-ignited internal combustion engine having exhaust gas recirculation by controlling ignition timing, the method comprising:
   detecting a misfire in an engine cylinder;
   determining a number of combustion cycles indicative of an amount of time that will pass before misfire gas from the detected misfire will be recirculated to a combustion chamber of any cylinder of the internal combustion engine; and
   reducing or preventing knocking combustion by adjusting the ignition timing of at least one subsequent combustion cycle, the at least one subsequent combustion cycle occurring after the determined number of combustion cycles have occurred since the misfire was detected.

2. The method of claim 1, further comprising determining a second number of combustion cycles, the second number of combustion cycles being indicative of a number of combustion cycles that are likely to experience increased fuel and air charge due to recirculated misfire gas, and
   wherein reducing or preventing knocking combustion further includes adjusting ignition timing for the second number of combustion cycles.

3. The method of claim 2, further comprising applying an original ignition timing after the ignition timing has been adjusted for the second number of combustion cycles.

4. The method of claim 3, wherein adjusting the ignition timing of the second number of combustion cycles further includes incrementally adjusting each successive combustion cycle to be closer to the original ignition timing.

5. The method of claim 1, wherein adjusting the ignition timing includes delaying ignition timing during a combustion cycle based on a predetermined unit of crank shaft angle degrees.

6. The method of claim 1, wherein determining a number of combustion cycles indicative of an amount of time that will pass before misfire gas from the detected misfire will be recirculated to a combustion chamber of any cylinder of the internal combustion engine includes accessing a value indicative of a predetermined number of combustion cycles stored to a non-transitory computer-readable medium.

7. The method of claim 6, wherein the predetermined number of combustion cycles is determined by calibrating an engine control unit based on an exhaust gas recirculation system.

8. The method of claim 1, wherein the misfire is detected by a measuring a crankshaft speed, acceleration, or both with a crankshaft sensor.

9. The method of claim 1, wherein the misfire is detected by measuring a current of a sparkplug.

10. The method of claim 1, wherein the misfire is detected by measuring cylinder pressure.

11. An engine system for reducing knocking combustion in a spark-ignited internal combustion engine having exhaust gas recirculation, the engine system comprising:
    a spark-ignited internal combustion engine;
    an exhaust gas recirculation system;
    a misfire detection sensor; and
    an engine control unit configured to
    detect a misfire in an engine cylinder;
    determine a number of combustion cycles indicative of an amount of time that will pass before misfire gas from the detected misfire will be recirculated to a combustion chamber of any cylinder of the internal combustion engine; and
    reduce or prevent knocking combustion by adjusting an ignition timing of at least one subsequent combustion cycle, the at least one subsequent combustion cycle occurring after the determined number of combustion cycles have occurred since the misfire was detected.

12. The engine system of claim 11, wherein the engine control unit is further configured to
    determine a second number of combustion cycles, the second number of combustion cycles being indicative of a number of combustion cycles that are likely to experience increased fuel and air charge due to recirculated misfire gas, and
    wherein reducing or preventing knocking combustion further includes adjusting ignition timing for the second number of combustion cycles.

13. The engine system of claim 12, wherein the engine control unit is further configured to apply an original ignition timing after the ignition timing has been adjusted for the second number of combustion cycles.

14. The engine system of claim 13, wherein the engine control unit is further configured to incrementally adjust each successive combustion cycle of the second number of combustion cycles to be closer to the original ignition timing.

15. The engine system of claim 11, wherein the engine control unit is further configured to delay ignition timing during a combustion cycle based on a predetermined unit of crankshaft angle degrees.

16. The engine system of claim 11, wherein the engine control unit is further configured to access a value indicative of a predetermined number of combustion cycles stored to a non-transitory computer-readable memory when determining a number of combustion cycles indicative of an amount of time that will pass before misfire gas from the detected misfire will be recirculated to a combustion chamber of any cylinder of the internal combustion engine.

17. The engine system of claim 16, wherein the predetermined number of combustion cycles is determined by calibrating the engine control unit based on the exhaust gas recirculation system.

18. An engine control unit for reducing knocking combustion in a spark-ignited internal combustion engine having exhaust gas recirculation, the engine control system comprising:
    an input port configured to receive a misfire signal indicative of a misfire in a cylinder of the spark-ignited internal combustion engine;
    a processor and a non-transitory, machine-readable medium configured to
    detect a misfire signal;
    determine a number of combustion cycles indicative of an amount of time that will pass before misfire gas from the misfire will be recirculated to a combustion chamber of any cylinder of the internal combustion engine; and
    reduce or prevent knocking combustion by adjusting ignition timing of at least one subsequent combustion cycle, the at least one subsequent combustion cycle occurring after the determined number of combustion cycles have occurred since the misfire was detected.

* * * * *